(12) United States Patent
Coudert et al.

(10) Patent No.: US 11,047,422 B2
(45) Date of Patent: Jun. 29, 2021

(54) CONNECTION ELEMENT, AND METHOD FOR PRODUCING A RING FOR SUCH A CONNECTION ELEMENT

(71) Applicant: SKF Aerospace France S.A.S, Montigny-le-Bretonneux (FR)

(72) Inventors: Jean-Baptiste Coudert, Granges les Beaumont (FR); Alexandre Mondelin, St-Marcel les Valence (FR); Arnaud Turmeau, Chabeuil (FR)

(73) Assignee: SKF Aerospace France S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 16/783,771

(22) Filed: Feb. 6, 2020

(65) Prior Publication Data
US 2020/0300290 A1   Sep. 24, 2020

(30) Foreign Application Priority Data
Mar. 18, 2019   (FR) ...................................... 1902744

(51) Int. Cl.
*F16C 33/46*   (2006.01)
*F16C 11/06*   (2006.01)

(52) U.S. Cl.
CPC ...... *F16C 33/4611* (2013.01); *F16C 11/0623* (2013.01); *F16C 11/0685* (2013.01)

(58) Field of Classification Search
CPC .............. F16C 33/3831; F16C 33/4611; F16C 33/581; F16C 33/605; F16C 35/067; F16C 35/07; F16C 35/077; Y10T 403/32155; Y10T 403/3933

USPC .................................. 403/71, 192; 464/178
See application file for complete search history.

(56) References Cited

U.S. PATENT DOCUMENTS

| | | | | |
|---|---|---|---|---|
| 4,084,861 A * | 4/1978 | Greenberg | ............ | F01D 25/164 384/105 |
| 5,265,965 A | 11/1993 | Harris | | |
| 8,573,922 B2 * | 11/2013 | Milfs | ..................... | F16C 33/581 415/9 |
| 8,747,054 B2 * | 6/2014 | Witlicki | ..................... | F02C 7/06 415/119 |
| 9,695,870 B2 * | 7/2017 | Amador | ................ | F16C 27/045 |
| 9,784,128 B2 * | 10/2017 | Long | ..................... | F16C 33/581 |
| 2003/0190099 A1 | 10/2003 | Alam | | |

(Continued)

FOREIGN PATENT DOCUMENTS

| | | |
|---|---|---|
| EP | 2011619 A2 | 1/2009 |
| EP | 2831434 A | 2/2015 |

(Continued)

*Primary Examiner* — Josh Skroupa
(74) *Attorney, Agent, or Firm* — Garcia-Zamor Intellectual Property Law; Ruy Garcia-Zamor; Bryan Peckjian

(57) ABSTRACT

A connection element providing a first ring and a second ring, the two rings rotating relative to one another about a central axis, the first ring having a contact portion with a contact surface interacting with the second ring for the relative rotation, and a fastening portion configured to be rigidly secured to a support. The contact portion is made of a first material and the fastening portion is made of a second material, different to the first material, the first material having a hardness strictly greater than that of the second material, and the second material having a structural fatigue strength strictly greater than that of the first material.

5 Claims, 2 Drawing Sheets

(56) References Cited

U.S. PATENT DOCUMENTS

2012/0291287 A1 11/2012 Reverchon
2013/0160604 A1 6/2013 McNeil
2016/0327098 A1 11/2016 Long, Jr.
2017/0210188 A1 7/2017 Meyer

FOREIGN PATENT DOCUMENTS

EP 2886892 A1 6/2015
GB 2564558 A 1/2019
WO 2018/109474 A1 6/2018

* cited by examiner

[Fig 1]
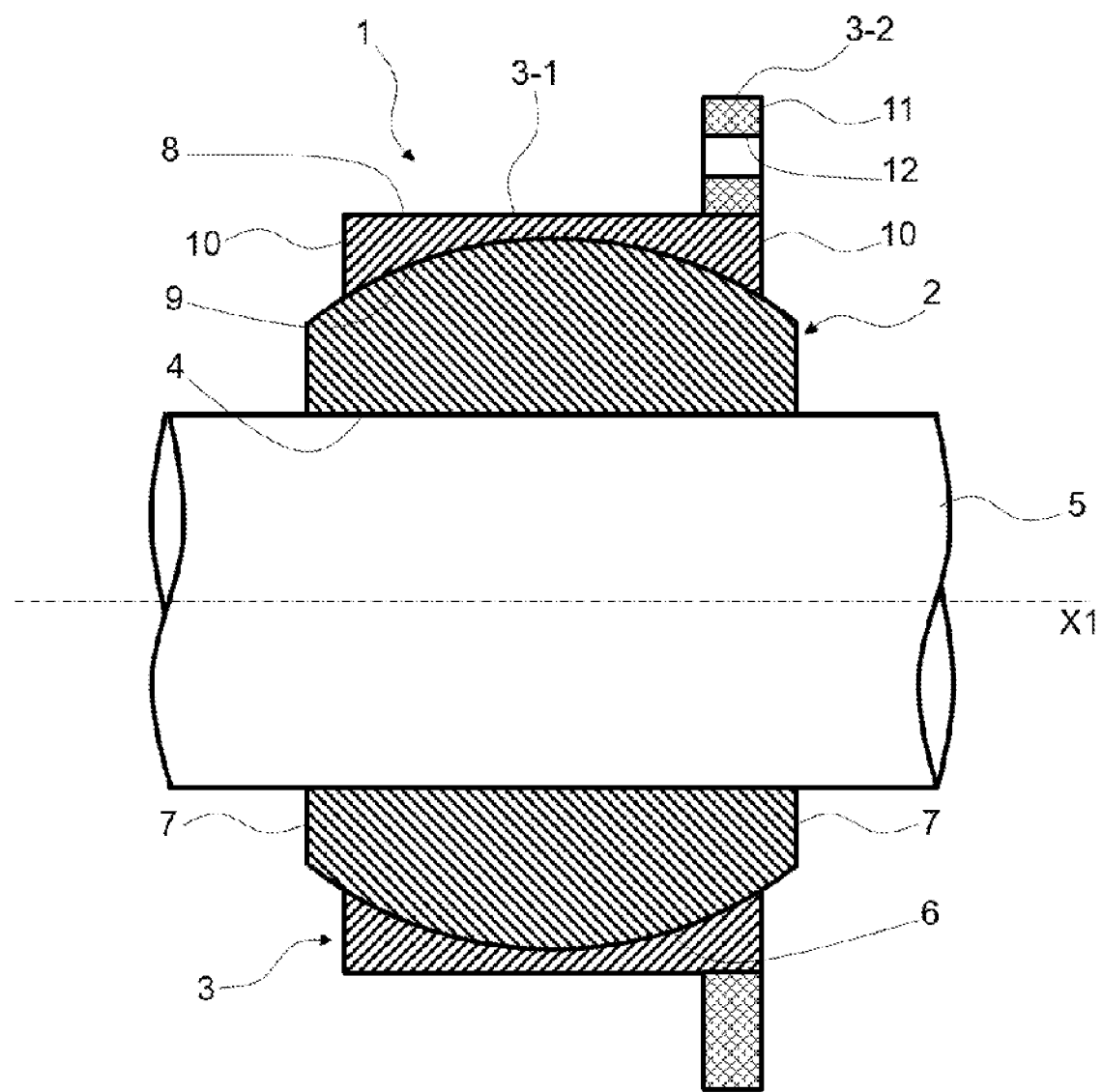

[Fig 2]
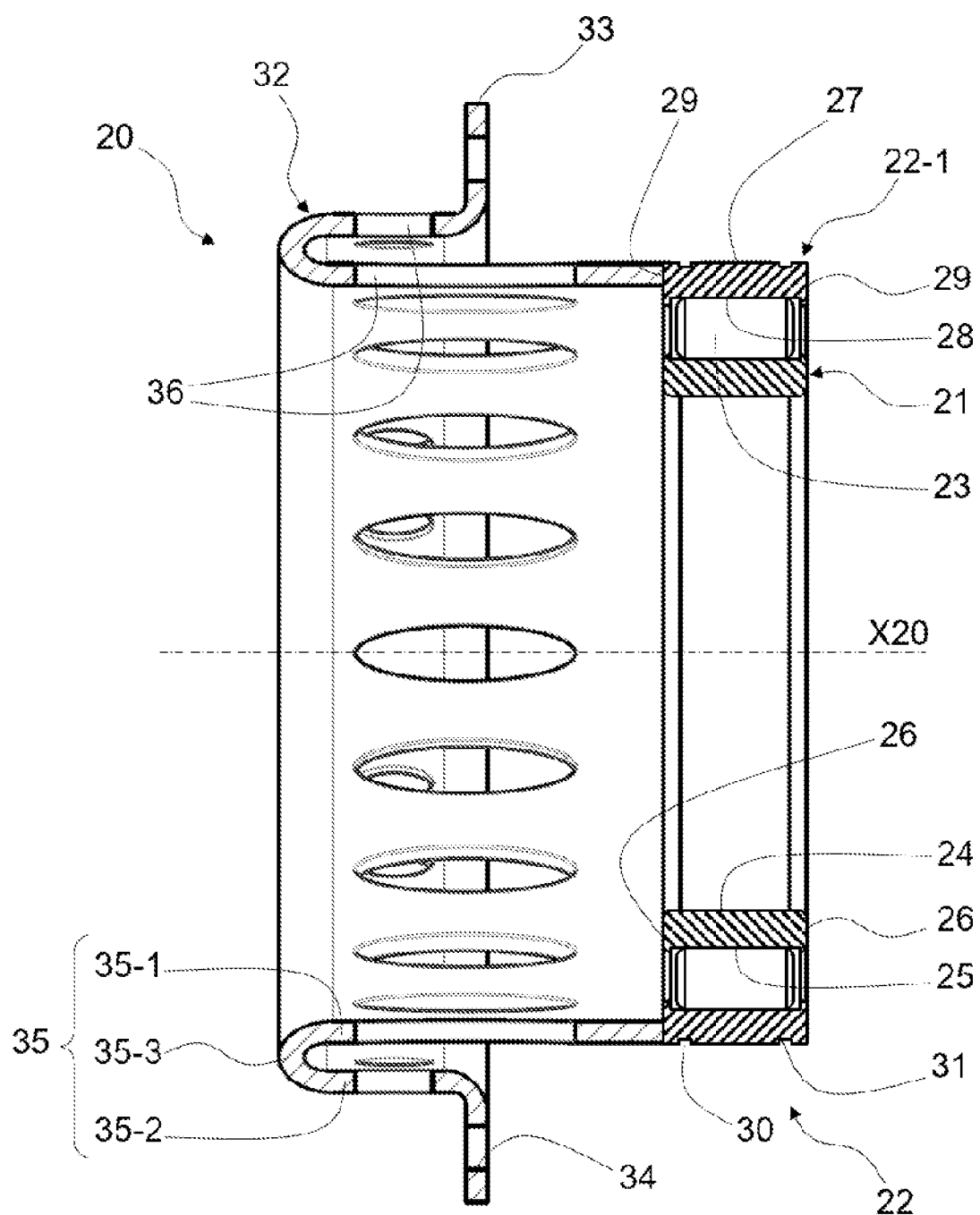

CONNECTION ELEMENT, AND METHOD FOR PRODUCING A RING FOR SUCH A CONNECTION ELEMENT

CROSS-REFERENCE TO RELATED APPLICATIONS

This application claims priority to French Patent Application no. 1902744, filed Mar. 18, 2019, the contents of which are fully incorporated herein by reference.

TECHNICAL FIELD OF THE INVENTION

The present invention relates to a connection assembly with a ring made from multiple materials, such as a bearing assembly with a squirrel cage, for use in gas turbines, for example, or an articulated connection such as a ball joint. Lastly, the invention also relates to a method for producing such a ring made from multiple materials.

BACKGROUND OF THE INVENTION

In the aeronautical industry, it is known to use an articulated connection in the form of a metal ball joint to immobilize two members, such as a connecting rod and a structural part, in translation relative to one another, while allowing relative rotational movement of these members.

Such a ball joint conventionally comprises an inner ring and an outer ring, both made of metal. An internal surface of the inner ring is designed to be mounted on a shaft, while the external surface is substantially spherical and designed to interact with a corresponding internal surface of the outer ring. The inner ring and the outer ring thus have three mutual degrees of freedom in rotation, while being fixed to one another in translation.

The outer ring may have a fastening flange extending radially outwards, the flange being intended to be rigidly secured to a fixed support, for example by means of through-screws. Such an outer ring is made as a single piece. However, the properties and performance required of an outer ring are two-fold: a high hardness and high fatigue strength, due to the bearing contact, for the internal surface in relative contact movement with the inner ring, and at the same time a degree of flexibility and a high resistance to loads for the fastening flange.

A similar problem is encountered with bearing assemblies having a squirrel cage, for use in gas turbines, for example.

Such a bearing assembly comprises an inner ring with an internal raceway, an outer ring with an external raceway, and a plurality of roller elements housed between the internal and external raceways. The outer ring also has a squirrel cage extending axially from the outer ring, the outer ring and the squirrel cage being made as a single piece. The squirrel cage has a rim for fastening to a fixed support, for example by means of through-screws. The squirrel cage further comprises an axial intermediate portion with a plurality of windows distributed circumferentially so as to give the cage a degree of flexibility so as to withstand various types of vibration of the assembly. It is also known to provide a film of lubricant between the outer ring and a surface of the fixed support, the film being accommodated in a sealed chamber between two seals, so as to filter the vibration.

Currently a compromise is reached by using metals with properties that are satisfactory with respect to the technical and structural requirements of such rings for connection assemblies. For example, these rings may be made of M50NiL, with the raceways also being hardened.

SUMMARY OF THE INVENTION

The present invention aims to overcome the abovementioned drawbacks.

More particularly, the present invention aims to provide a connection element with a ring having a raceway with improved specific properties, which also has a fastening portion with improved specific properties, without compromise on either side, the connection element being less expensive, easy to produce and more lightweight.

The invention relates to a connection element comprising a first ring and a second ring, the two rings rotating relative to one another about a central axis. The first ring comprises a contact portion with a contact surface interacting with the second ring for the relative rotation, and a fastening portion intended to be rigidly secured to a support.

According to the invention, the contact portion is made of a first material and the fastening portion is made of a second material, different to the first material. The first material has a hardness strictly greater than that of the second material. The second material has a structural fatigue strength strictly greater than that of the first material.

According to further advantageous, but not obligatory, features of the invention, such a connection element is an articulated connection, and may also include the following features, taken alone or in any technically feasible combination:

The contact surface of the contact portion of the first ring is in direct sliding contact against a contact surface of the second ring.

The contact surfaces are spherical.

The connection element is a ball joint.

The first material is one out of the following list: bronze, steel, cobalt alloy, titanium alloy, nickel alloy.

The second material is one out of the following list: titanium alloy, aluminium alloy, nickel alloy.

The fastening portion of the first ring consists of an annular flange.

The flange extends radially.

The fastening portion of the first ring comprises a plurality of through-openings, each intended to receive a fastening screw so as to be rigidly secured to a support.

According to further advantageous, but not obligatory, features of the invention, such a connection element is a bearing with roller elements, and may also include the following features, taken alone or in any technically feasible combination:

At least one row of roller elements is inserted between the contact surface of the contact portion of the first ring and a contact surface of the second ring.

The first material is one out of the following list: 100C6, high speed steel M50, ASP 2060 or M62.

The second material is one out of the following list: low carbon steel, medium carbon steel, titanium alloy, aluminium alloy, M50NiL, 32CVD13, INCONEL718.

The first ring is an outer ring, and the second ring is an inner ring.

The fastening portion of the first ring is a squirrel cage.

The squirrel cage comprises a fastening rim and a portion with a plurality of windows distributed circumferentially.

The rim extends radially.

The portion with a plurality of windows distributed circumferentially extends essentially axially.

The fastening portion of the first ring comprises a plurality of through-openings, each intended to receive a fastening screw so as to be rigidly secured to a support.

The present invention also relates to a method for producing a first ring of a connection element according to any of the above embodiments. The production method comprises the following steps:

The contact portion is machined from a bar or by additive manufacturing from the first material, and has a contact surface.

The contact portion is mounted in a fixed support, in such a way that part of its outer surface is free.

The second material is stored in powder form, the fastening portion being produced on the free part of the contact portion using the powder.

The dimensions of the fastening portion are finalized by machining.

According to further advantageous, but not obligatory, features of the invention, step (c) of such a method is performed by 3D printing.

According to this particular embodiment of the method, the contact portion is mounted, in step (b), in a fixed support in such a way that only the surface on which the fastening portion will be produced is flush with a mounting surface of the support. To this end, the contact portion may be housed in a recess of the support. According to one particularly advantageous embodiment, the outer surface part may be ground so as to be perfectly flush with the mounting surface of the support.

Thus assembled, the contact portion and the support are fitted in a 3D printer. In step (c) of the method, successive layers of the second material are deposited on the free surface of the contact portion, until the fastening portion is formed.

According to further advantageous, but not obligatory, features of the invention, a mould having the shape of the fastening portion is mounted on the contact portion, in such a way that only the surface on which the fastening portion will be formed is free inside the mould.

In step (c) of the method, the fastening portion is formed by injecting the powder into the mould, which is closed, under vacuum. The shape thus obtained is solidified by hot isostatic pressing (HIP).

Alternatively, the powder of the second material may be fused by electron beam melting, selective laser melting, or by direct metal deposition.

According to other embodiments, the method for producing the ring may also include a step of deposition of a surface coating.

BRIEF DESCRIPTION OF THE FIGURES

The invention will become clearer on reading the following description, provided purely by way of non-limiting example.

The description refers to the attached drawings, in which:

[FIG. 1] is a schematic view in cross section of a ball joint according to one embodiment of the invention, mounted on a shaft; and

[FIG. 2] is a schematic view in partial cross section of a bearing element with a squirrel cage according to one embodiment of the invention.

DETAILED DESCRIPTION OF THE INVENTION

FIG. 1 shows a ball joint connection element, indicated in general with the reference sign 1, with a central axis X1.

The ball joint 1 comprises an inner ring 2 and an outer ring 3.

The inner ring 2 comprises a substantially cylindrical internal surface 4, intended to be positioned against the external periphery of a corresponding cylindrical shaft 5. The inner ring 2 further comprises an external surface 6 with the profile of a sphere, more specifically as sections of a sphere. The internal surface 4 and external surface 6 of the inner ring 2 are connected to one another by side walls 7. According to an embodiment not shown, the inner ring 2 may also have a cylindrical sleeve inserted between its internal surface 4 and the external periphery of the shaft 5. This sleeve may be made of bronze, for example.

The inner ring 2 consists of a titanium alloy, for example TA6V. Alternatively, this ring is consists of a nickel alloy, or steel.

The outer ring 3 comprises a substantially cylindrical external surface 8. The outer ring 3 further comprises an internal surface 9 which is spherical, more specifically as sections of a sphere, corresponding to that of the external surface 6 of the inner ring 2. The inner ring 2 and the outer ring 3 thus have, with respect to one another, three degrees of freedom in rotation. The internal surface 9 is connected to the external surface 8 by side walls 10. The side walls 7 of the inner ring 2 project, in axial section, on either side of the side walls 10 of the outer ring 3 in the position of FIG. 1, in which the cylindrical surface 4 is coaxial with the shaft 5.

The outer ring 3 further comprises an annular flange 11 projecting from the outer surface 8 and extending in a radial direction away from the central axis X1. The annular flange has at least one through-opening 12 provided to receive a fastening screw for rigidly securing the outer ring 3 to a support.

According to the invention, the outer ring 3 is made of two different materials. The outer ring 3 comprises a contact portion 3-1 designed to come into sliding contact against the inner ring 2 and made of a first material. The outer ring further comprises a fastening portion 3-2 made of a second material, different to the first material.

The contact portion 3-1 comprises the external surface 8 and internal surface 9, and the side walls 10. The contact portion 3-1 is made of a material having a hardness strictly greater than that of the second material. Thus, the contact portion 3-1 is made of a specific material for fulfilling the function of swiveling by direct sliding against the inner ring 2. The first material is one out of the following list: bronze, steel, cobalt alloy.

The fastening portion 3-2 consists of the flange 11 and is made of a material having an elasticity strictly greater than that of the first material. Thus, the fastening portion 3-2 is made of a specific material for withstanding loads and vibration. The second material is one out of the following list: titanium, titanium alloy, aluminium alloy, nickel alloy.

A further advantage of the present invention is that the material used for the fastening portion 3-2 is less expensive than that used for the contact portion 3-1, or indeed for an outer ring produced as a single piece and made of a material representing a compromise with respect to the requirements. The material used for the fastening portion 3-2 is also more lightweight than that used for the contact portion 3-1, or indeed for an outer ring produced as a single piece and made of a material representing a compromise with respect to the requirements. This gives a ball joint ring that can perform each of the two functions, swiveling and fastening, optimally, at lower cost and lower weight.

A second embodiment of the invention is shown in FIG. 2, in which the connection element consists of a bearing element with roller elements, indicated in general with the reference sign 20, with a central axis X20.

The bearing 20 comprises an inner ring 21, an outer ring 22, and a plurality of roller elements 23.

The inner ring 21 has a substantially cylindrical internal surface 24, a cylindrical external surface 25 forming an internal raceway for the roller elements 23, and side walls 26 connecting the internal surface 24 and external surface 25.

The inner ring 21 is made of steel, for example M50.

The outer ring 22 has a substantially cylindrical external surface 27, a cylindrical internal surface 28 forming an external raceway for the roller elements 23, and side walls 29 connecting the external surface 27 and internal surface 28.

Advantageously, the external surface 27 comprises two circumferential grooves 30, 31 that can each receive an O-ring seal (not shown), a film of fluid being provided axially between the two seals housed in the grooves 30, 31, the film being trapped radially between the external surface 27 and a surface of a fixed support (not shown) so as to form a means for attenuating vibration.

The roller elements 23 are housed between the internal raceway 25 and external raceway 28. In the example shown in FIG. 2, the roller elements 23 are cylindrical rollers of axis parallel to the central axis X1. Alternatively, the roller elements may take another form, for example balls or conical rollers.

According to the embodiment shown in FIG. 2, the outer ring 22 also has a squirrel cage 32 extending axially from a side wall 29 of the outer ring 22.

The squirrel cage 32 has a fastening rim 33 extending essentially radially and intended to be rigidly secured to a fixed support (not shown), for example by means of threaded screws passing through through-openings 34 and being received in corresponding tapped holes in the support. The squirrel cage 32 further comprises an intermediate portion 35 that is essentially axial with a plurality of windows 36 distributed circumferentially so as to give the cage 32 a degree of flexibility so as to withstand various types of vibration of the assembly. According to the embodiment shown in FIG. 2, the intermediate portion 35 comprises two axial portions 35-1, 35-2, each with windows 36, the axial portion 35-2 having a diameter greater than the diameter of the axial portion 35-1. The two axial portions 35-1, 35-2 are connected by a bent portion 35-3. The fastening rim 33 extends radially from a free end of the axial portion 35-2 of greater diameter.

According to the invention, the outer ring 22 is made of two different materials. The outer ring 22 comprises a contact portion 22-1 designed to come into bearing contact against the roller elements 23 and made of a first material. The outer ring 22 further comprises the squirrel cage 32 made of a second material, different to the first material.

The contact portion 22-1 comprises the external surface 27 and internal surface 28, and the side walls 29. The contact portion 22-1 is made of a material having a hardness strictly greater than that of the second material. Thus, the contact portion 22-1 is made of a specific material for fulfilling the function of direct bearing support for the roller elements 23. The first material is a steel from the following list: 100C6, ASP 2060, M50, M62.

The squirrel cage 32 is made of a material having an elasticity strictly greater than that of the first material. Thus, the squirrel cage 32 is made of a specific material for withstanding loads and vibration. The second material is one out of the following list: low carbon steel, medium carbon steel, titanium alloy, aluminium alloy, M50NiL, 32CVD13, INCONEL718.

The rings 3 and 22 of the two embodiments shown in FIG. 1 are both made of two different materials. According to the invention, the rings 3 and 22 are produced by a method comprising the following steps.

The contact portion 3-1, 22-1 is machined from a bar of the first material, and has a contact surface 9, 28, respectively. The definitive dimensions and shape of the contact portion 3-1, 22-1 may be produced starting from this step.

Next, the contact portion 3-1, 22-1 thus obtained is mounted in a fixed support, in such a way that part of its outer surface is free. This outer surface part corresponds to the surface on which the fastening portion will be formed and attached in subsequent steps. Thus, the outer surface of the side wall 10 of the contact portion 3-1 is left free, and the outer surface of the side wall 29 of the contact portion 22-1 is left free. According to a particular embodiment of this method, the contact portion is mounted in a fixed support in such a way that only the surface of the side wall 10, 29 is flush with a mounting surface of the support. To this end, the contact portion 3-1, 22-1 may be housed in a recess of the support. According to a particularly advantageous embodiment, the outer surface part 10, 29 may be ground so as to be perfectly flush with the mounting surface of the support.

According to a first embodiment of the method, the contact portion 3-1, 22-1 and the support are fitted in a 3D printer. The second material is stored in powder form, and the shape of the fastening portion 3-2, 32 is printed on the contact portion 3-1, 22-1, respectively. More specifically, successive layers of the second material are deposited on the free surface of the side wall 10, 29 of the contact portion 3-1, 22-1, until the fastening portion 3-2, 22 is formed.

According to a second embodiment, a mould having the shape of the fastening portion is mounted on the contact portion 3-1, 22, in such a way that only the surface of the side wall 10, 29 on which the fastening portion will be formed is free inside the mould.

The fastening portion 3-2, 32 is formed by injecting powder into the mould, which is closed, under vacuum. The shape thus obtained is consolidated by hot isostatic pressing (HIP).

According to further embodiments, the powder of the second material may be fused by electron beam melting, selective laser melting, or by direct metal deposition.

Lastly, the dimensions of the fastening portion 3-2, 22 are finalized by machining. The method for producing the ring 3, 22 may also include a step of deposition of a surface coating, in particular on the raceways 9, 28.

Furthermore, the technical features of the different embodiments may, as a whole and only in the case of some, be combined. Thus, the ball joint may be adapted in terms of cost, performance and user-friendliness.

The present invention has been described for an articulated part in the form of a ball joint and for a bearing element, as examples of embodiments. The present invention may be used for any kind of connection element.

The invention claimed is:

1. A connection element comprising:
 a first ring comprising a contact portion and a squirrel cage, the contact portion having a contact surface, the squirrel cage having a fastening portion intended to be rigidly secured to a support,
 a second ring, the two rings rotating relative to one another about a central axis, the contact surface and the second ring being configured for placement of a plurality of roller elements therebetween wherein the contact portion is made of a first material and the squirrel cage is made of a second material, different to the first material, the first material having a hardness strictly greater than that of the second material, and the second material having a structural fatigue strength strictly greater than that of the first material, and the squirrel cage and the fastening portion of the first ring do not axially overlap the second ring.

2. The connection element according to claim 1, further comprises the plurality of roller elements disposed between the contact surface of the contact portion of the first ring and a second contact surface of the second ring.

3. The connection element according to claim 2, wherein the first material is one out of the following list: 100C6, high speed steel M50, ASP 2060 or M62.

4. The connection element according to claim 2, wherein the second material is one out of the following list: low carbon steel, medium carbon steel, titanium alloy, aluminium alloy, M50NiL, 32CVD13, INCONEL718.

5. The connection element according to claim 1, wherein the squirrel cage comprises a radial fastening rim and an essentially axial portion with a plurality of windows distributed circumferentially.

\* \* \* \* \*